(12) United States Patent
Tarumi

(10) Patent No.: US 8,988,715 B2
(45) Date of Patent: Mar. 24, 2015

(54) INFORMATION PROCESSING APPARATUS, CONTROL METHOD, AND STORAGE MEDIUM

(71) Applicant: Canon Kabushiki Kaisha, Tokyo (JP)

(72) Inventor: Takeshi Tarumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/738,825

(22) Filed: Jan. 10, 2013

(65) Prior Publication Data
US 2013/0182286 A1    Jul. 18, 2013

(30) Foreign Application Priority Data

Jan. 16, 2012 (JP) ................... 2012-006044

(51) Int. Cl.
*G06F 3/12* (2006.01)
*G06K 15/02* (2006.01)

(52) U.S. Cl.
CPC .............. *G06K 15/02* (2013.01); *G06F 3/1205* (2013.01); *G06F 3/1253* (2013.01)
USPC ........................... 358/1.15; 715/273; 715/864

(58) Field of Classification Search
CPC .............................. G06K 15/02; G06F 3/1254
USPC ......................................................... 358/1.15
See application file for complete search history.

(56) References Cited

U.S. PATENT DOCUMENTS

2012/0026548 A1 *   2/2012   Nakagawa ................... 358/1.15

FOREIGN PATENT DOCUMENTS

JP        2001-318779 A       11/2001
WO     WO 2011135792 A1 *    11/2011

\* cited by examiner

*Primary Examiner* — Benjamin O Dulaney
(74) *Attorney, Agent, or Firm* — Canon U.S.A., Inc. IP Division

(57) ABSTRACT

In a touch panel environment, it is difficult to notice when a printer driver displays a user interface and whether processing is waiting for an input from a user at the time of printing. When print setting information requiring that a printer driver displays a message dialogue for prompting a user's input at the time of printing is set, an information processing apparatus activates software operated in a desktop environment in a process different from print processing.

23 Claims, 13 Drawing Sheets

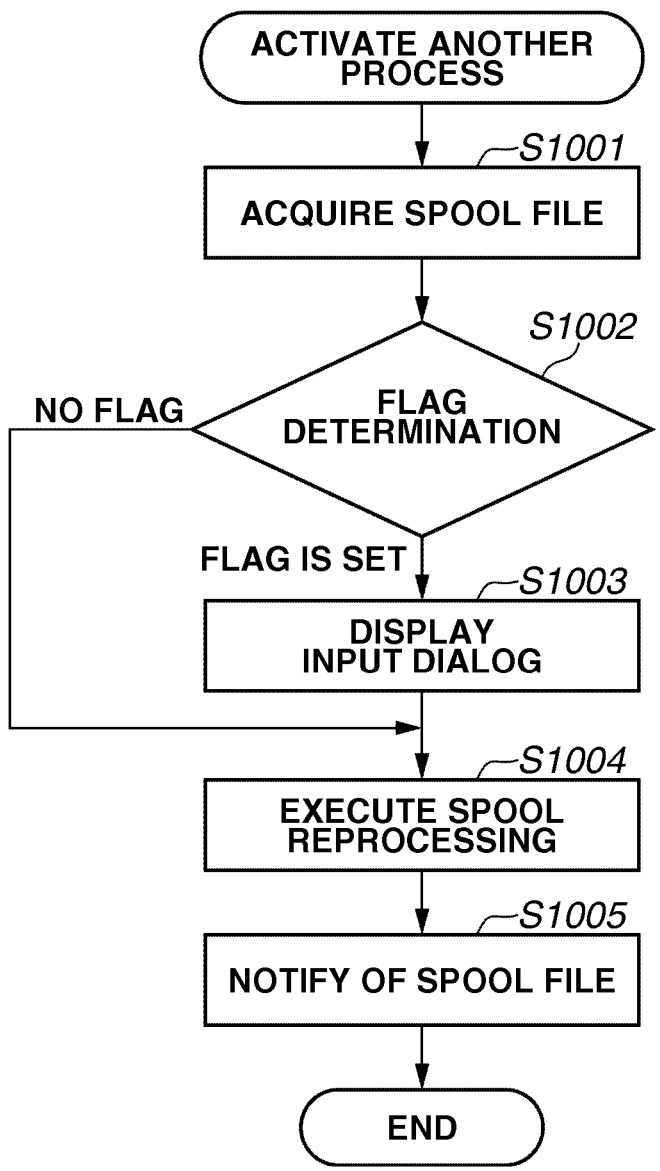

1

INFORMATION PROCESSING APPARATUS, CONTROL METHOD, AND STORAGE MEDIUM

BACKGROUND OF THE INVENTION

1. Field of the Invention

The present invention relates to an information processing apparatus for executing print processing, a control method, and a storage medium.

2. Description of the Related Art

A printer is normally controlled by software referred to as a printer driver operated in a host computer. Roles of the printer driver are largely classified into two. One is a role of receiving print setting information from a user. For this role, the printer driver includes a user interface (UI) for receiving the print setting information. The other is a role of converting a rendering command from an application into print data (page description language: PDL) interpretable by the printer and transmitting the print data to the printer. Both roles are managed by an operating system (OS) in the host computer.

In addition, to request a user to input user input information such as a password at the time of printing, processing for displaying an input dialogue at the time of printing to wait for a user input and realizing confidential printing by using an input value is performed (Japanese Patent Application Laid-Open No. 2001-318779). However, depending on an environment of the OS, the input dialogue for receiving the user input information such as the password, described in Japanese Patent Application Laid-Open No. 2001-318779, may not be displayed to be easily recognized by the user at the time of printing. As a result, there is a possibility that the print processing may not be appropriately performed.

SUMMARY OF THE INVENTION

According to an aspect of the present invention, an information processing apparatus includes an activation unit configured to newly activate software operated in a second environment different from a first environment, if in the first environment, a printing instruction is received from an application operated in the first environment and print setting information includes print setting information requiring user input information. In response to new activation of the software by the activation unit, the first environment is changed to the second environment, and an input user interface for inputting the user input information is displayed in the changed second environment.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 is a flowchart illustrating an example of processing of a process activated by the printer driver according to the exemplary embodiment of the present invention.

DESCRIPTION OF THE EMBODIMENTS

Various exemplary embodiments, features, and aspects of the invention will be described in detail below with reference to the drawings.

Figure 1:
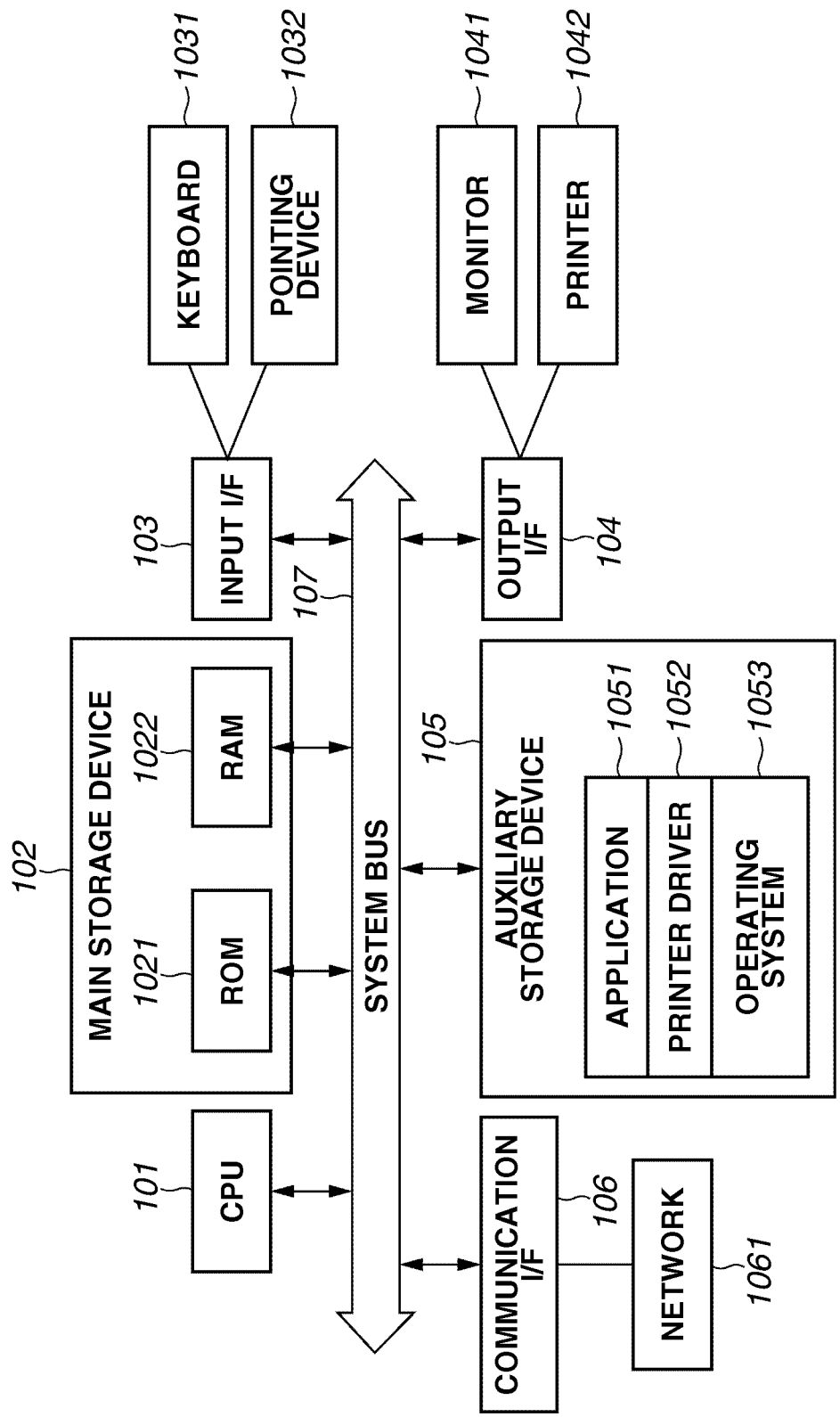
FIG. 1 is a block diagram illustrating an example of hardware and software of a computer system according to an exemplary embodiment of the present invention.

FIG. 1 is a block diagram illustrating an information processing apparatus (generally referred to as a computer or a client computer). Needless to say, unless specified otherwise, the present invention can be applied to a system having a single function or a plurality of functions, or a system connected via a network to perform processing as long as a function of the present invention is executed.

A central processing unit (CPU) 101 controls the entire apparatus according to a program stored in a read-only memory (ROM) 1021 or a random access memory (RAM) 1022 in amain storage device 102, or an auxiliary storage device 105. The RAM 1022 is also used as a work area for executing various processes by the CPU 101. The auxiliary storage device 105 records an operating system (OS) 1053 or an application 1051. An input device such as a pointing device 1032 represented by a keyboard 1031 or a mouse, or a touch panel is a device for enabling a user to input various instructions to the computer via an input interface (I/F) 103.

An output I/F 104, which is an interface for outputting data to the outside, outputs the data to an output device such as a monitor 1041 or a printer 1042. The output I/F 104 can be connected to the printer 1042 via not only a directly connected local input/output (I/O) but also a network 1061 connected through a communication I/F 106. A common data system bus 107 is used for transferring data between the I/Fs or between modules. The CPU 101 executes processing based on the program stored in the auxiliary storage device 105, so that a computer software configuration illustrated in FIG. 3 and processing of respective steps in a flowchart described below may be realized.

Figure 2:
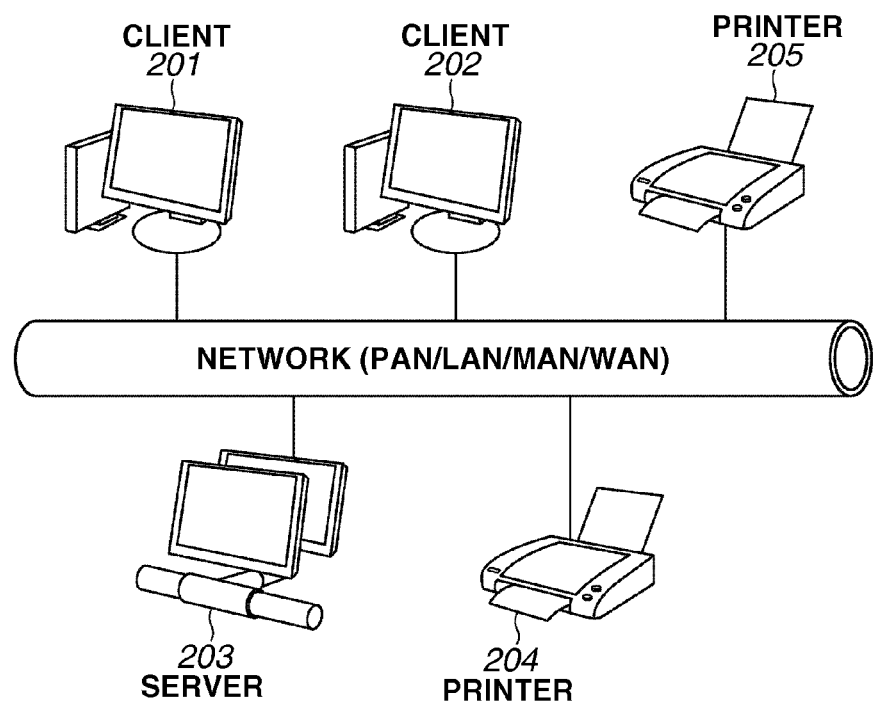
FIG. 2 illustrates an example of a network to which a client, a server, and a printer are connected according to an exemplary embodiment of the present invention.

FIG. 2 illustrates an environment of the network 1061 in a simplified manner according to the present invention. Client computers 201 and 202 for creating a document or an image to be printed are connected to a single network or a plurality of networks. A server computer 203 for managing a client user or a printer may be connected to the network. Printers 204 and 205 are connected to a single or a plurality of networks, and may bet set in an OFF-line state not to be actually used even if physically connected as in the case of the printer 205. There are small to large networks such as a personal area network (PAN), a local area network (LAN), a metropolitan area network (MAN), and a wide area network (WAN), and the above-described devices are connected to all the networks. As in the case of a cloud environment, a server or a printer may be connected over the Internet.

Figure 3:
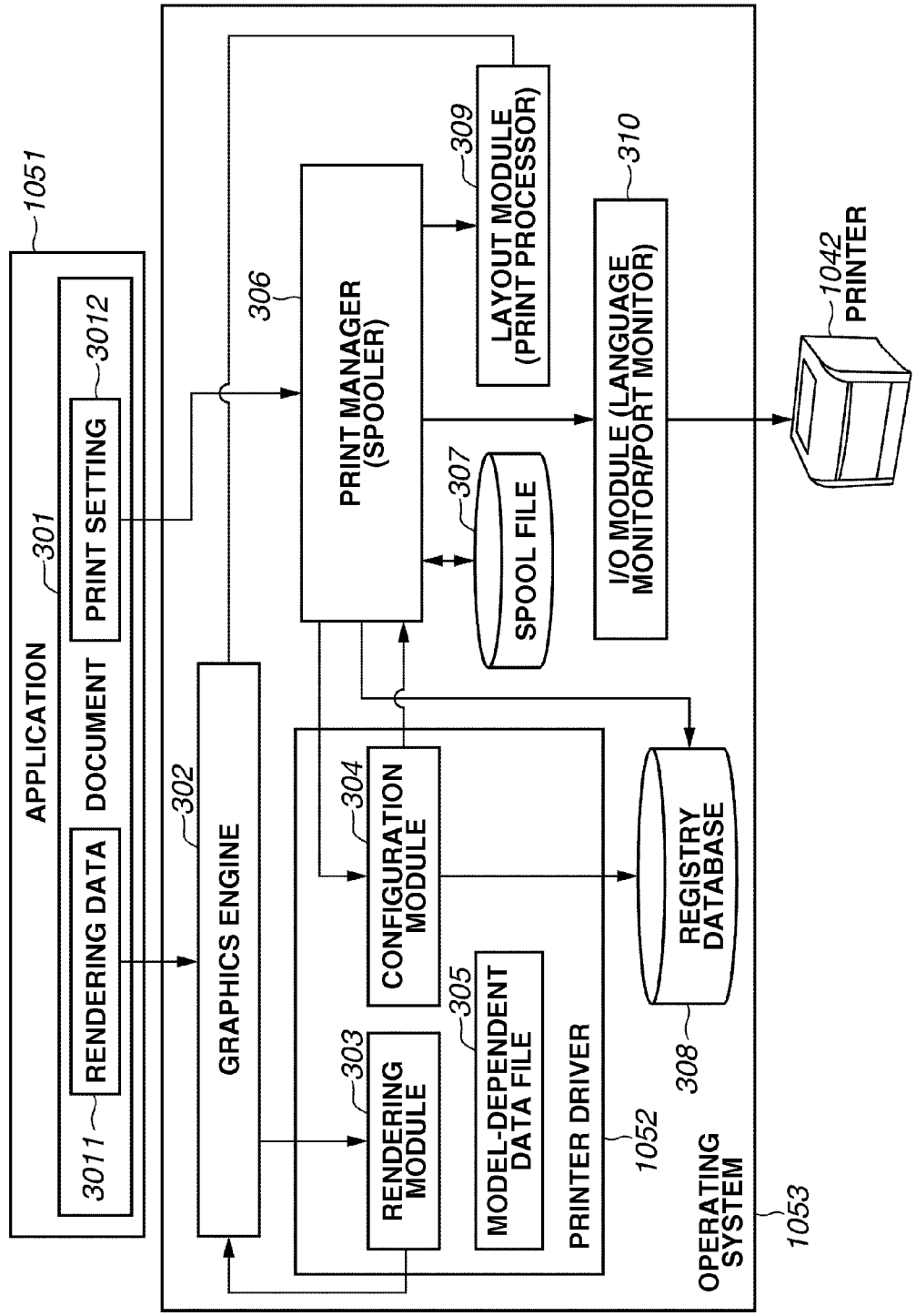
FIG. 3 is a block diagram illustrating an example of a print processing system using a general computer according to the exemplary embodiment of the present invention.

FIG. 3 illustrates a print processing system of the information processing apparatus. The application 1051, a printer driver 1052, and the OS 1053 are stored in the auxiliary storage device 105 illustrated in FIG. 1. A graphics engine 302 and a print manager 306 are modules included in the OS 1053. A user can instruct, with the input device such as the keyboard 1031 or the mouse 1032, execution of print processing of a document 301 created with use of the application 1051 displayed on a monitor 1041 of the output device. The print processing is executed by sequentially performing three processes, namely, selection of a printer, creation of print setting information, and conversion of rendering data. First, in the selection of a printer, the printer driver 1052 corresponding to a printer 1042 for executing printing is selected (in other words, a print queue is selected).

Then, print setting information 3012 is created. For the print setting information 3012, an initial value is set by a configuration module 304 of the printer driver 1052. The created print setting information 3012 is changed to be a final printing result desired by the user with use of a user interface of the application 1051 or the printer driver 1052. For example, the print setting information 3012 is changed to a sheet size to be output, or setting for two-sided printing or monochrome printing. The user interface of the printer driver 1052 is provided by the configuration module 304.

The print setting information 3012, which is secured in the RAM 1022, is stored in such a form as a binary data structure or a markup language, i.e., Extensible Markup Language (XML). The storage form varies according to specifications of the printer driver 1052 or the OS 1053. The print setting information 3012 is created each time a document is printed. However, the printer driver 1052 stores setting information to be stored, such as an optional device configuration of the printer 1042 and an environment setting for each user, in a registry database 308 of the OS 1053. A print manager 306 of the OS 1053 stores a default value of the print setting information 3012 for each user in the registry database 308.

Lastly, the rendering data is converted. The application 1051 receives, after the print setting information 3012 has been created, an instruction to execute print processing from the user, and notifies the OS 1053 of the print processing. The OS 1053 performs rendering to the designated printer driver 1052 via the graphics engine 1053. When layout processing is designated in the print setting information 3012, before the processing proceeds to a rendering module 303 of the printer driver 1052, the printer driver 1052 generates a temporary spool file 307 via the printer manager 306.

Then, the printer driver 1052 activates a layout module 309. The layout processing is for changing an order of pages or arranging a plurality of pages in a region equivalent to one sheet surface. The layout module 309 executes rendering again to the printer driver 1052 after changing the layout. The printer driver 1052 converts the received rendering data into a data language or a printer control language understandable by the printer. At this time, the print setting information 3012 is also converted into the printer control language.

The rendering module 303 and the configuration module 304 are both common modules among a plurality of types of printers 1042 in many cases, and a difference between models is described in a model-dependent data file 305. The rendering module 303 and the configuration module 304 refer to the model-dependent data file 305 as appropriate. The converted data are sequentially stored as spool files 307.

The print manager 306 acquires the spool file 307, and performs schedule management of the print processing as a print job file. When the printer is ready for printing, the print manager 306 sequentially transmits print data to the printer 1042 via an input/output (I/O) module 310. Accordingly, the rendering data issued from the application and the print data based on the print setting information are transmitted to the printer, and printing is executed.

Figure 4:
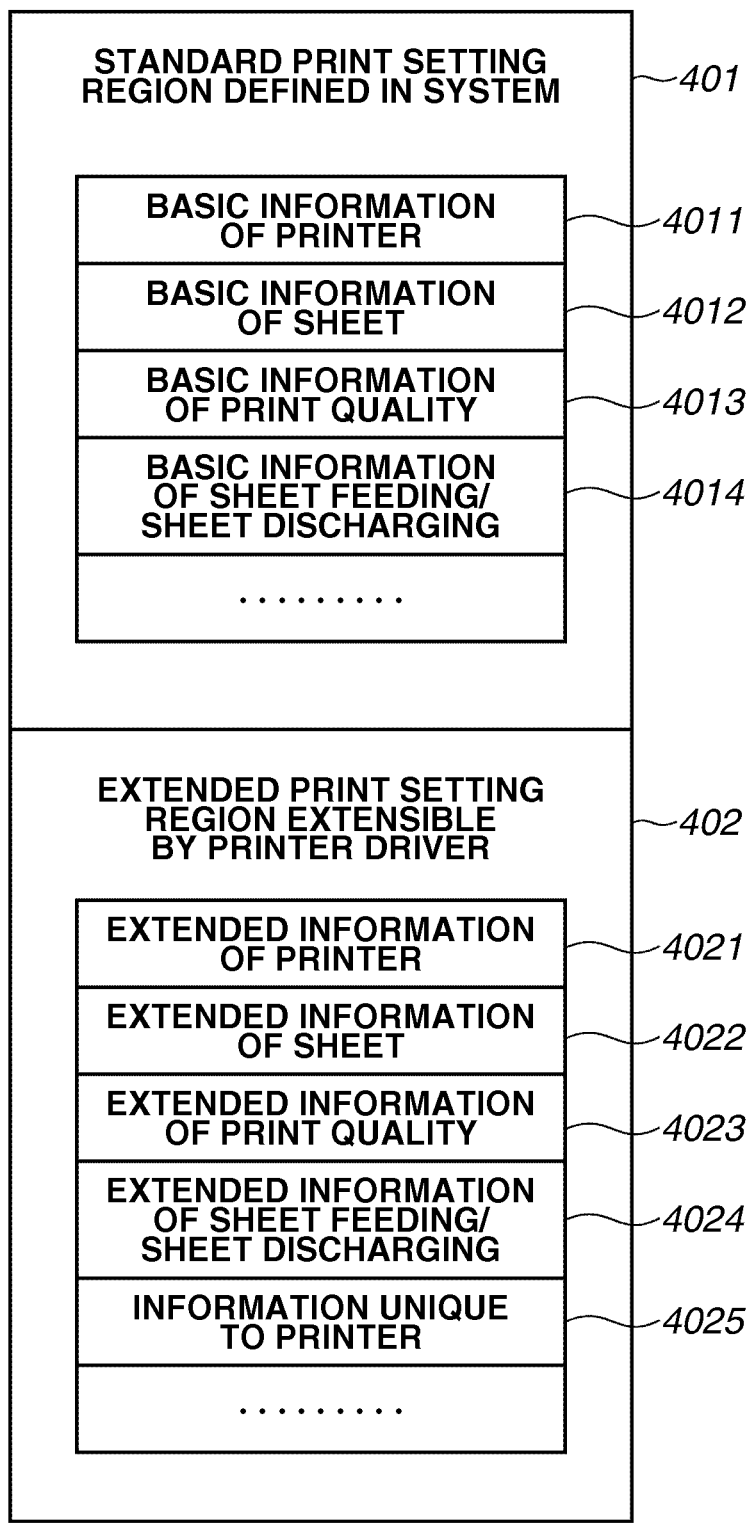
FIG. 4 is a block diagram illustrating an example of a data structure of a DEVMODE structure that is a print setting according to the exemplary embodiment of the present invention.
Figure 5A:
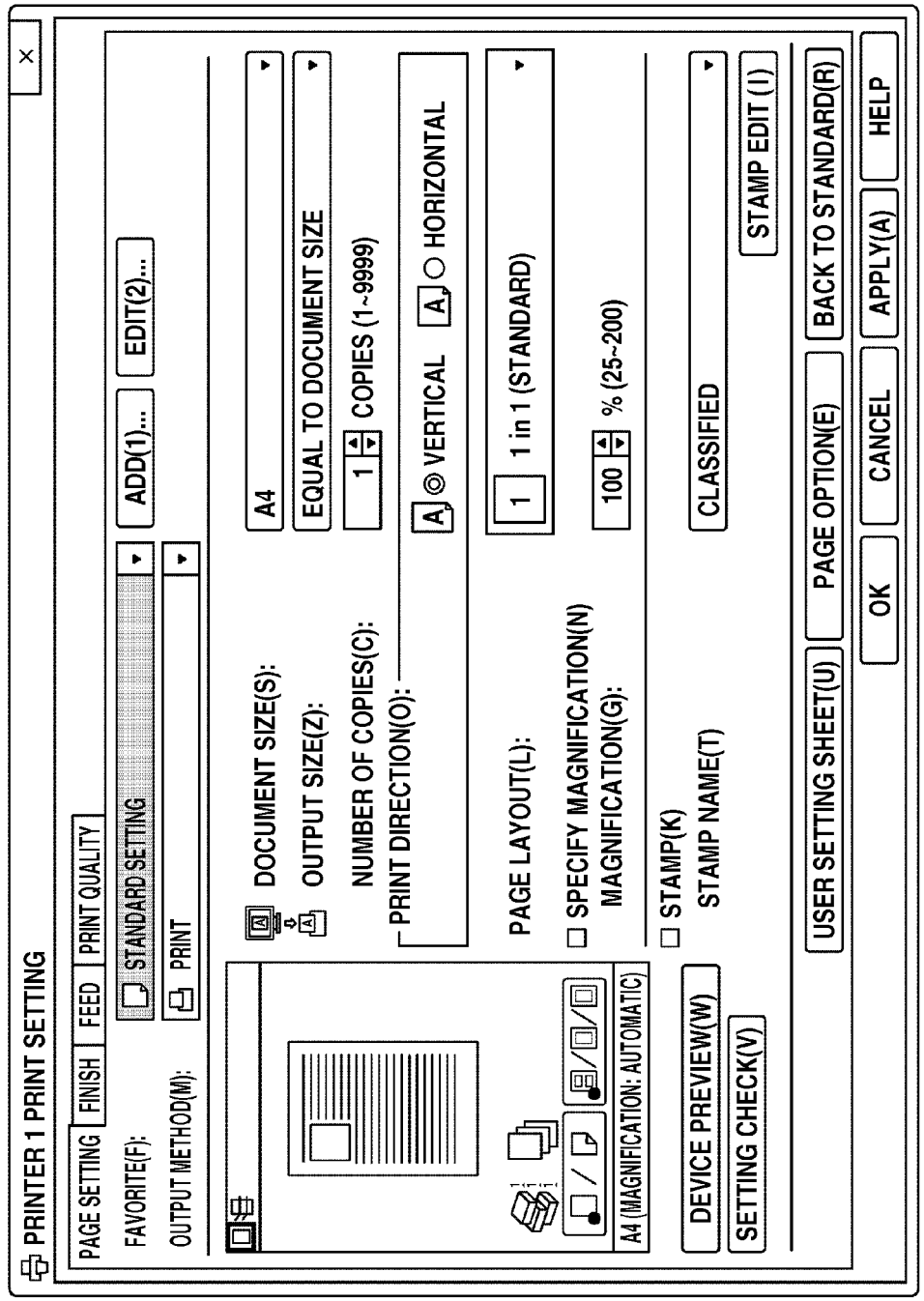
FIG. 5A illustrates an example of a user interface of a printer driver according to the exemplary embodiment of the present invention.

To create the print setting information 3012 of the document 301, the print setting information 3012 is directly rewritten by the application, or a user interface (FIG. 5A) provided by the configuration module 304 of the printer driver 1052 is used. The print setting information 3012 has a structure referred to as a DEVMODE structure illustrated in FIG. 4 in a Microsoft (registered trademark) Windows (registered trademark) OS. The DEVMODE structure is divided into a standard setting region 401 publicly defined in the OS and a print setting region 402 extended by the printer driver. The standard setting region 401 includes basic print setting values such as changing of a sheet size or a sheet feeding stage, and changing between color printing and monochrome printing. The extended print setting region 402 includes values such as a sheet discharging function and a fine color adjustment function according to options of the printer.

The application cannot know extended settings of each printer driver 1052, and thus the application can directly rewrite only the print setting in the standard setting region 401 defined in the system. Thus, the application generally displays the user interface of the printer driver 1052, and causes the user to perform setting on the extended print setting region 402. The configuration module 304 provides not only the user interface but also an application program interface (API). Thus, the setting on the extended print setting region 402 can be performed from the outside without displaying the user interface. However, when the API of the configuration module 304 is used, the application needs to deal with it for each printer driver 1052. Thus, a general application changes only the standard setting region 401.

Figure 6:
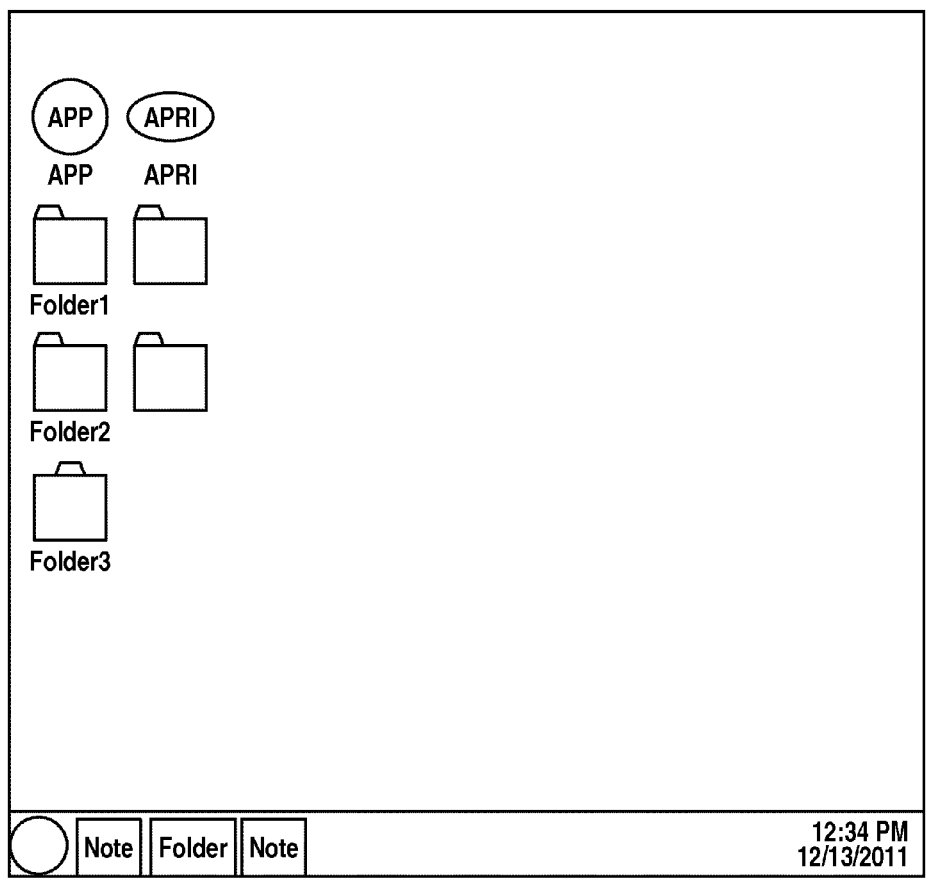
FIG. 6 illustrates an example of a conventional UI environment.
Figure 7:
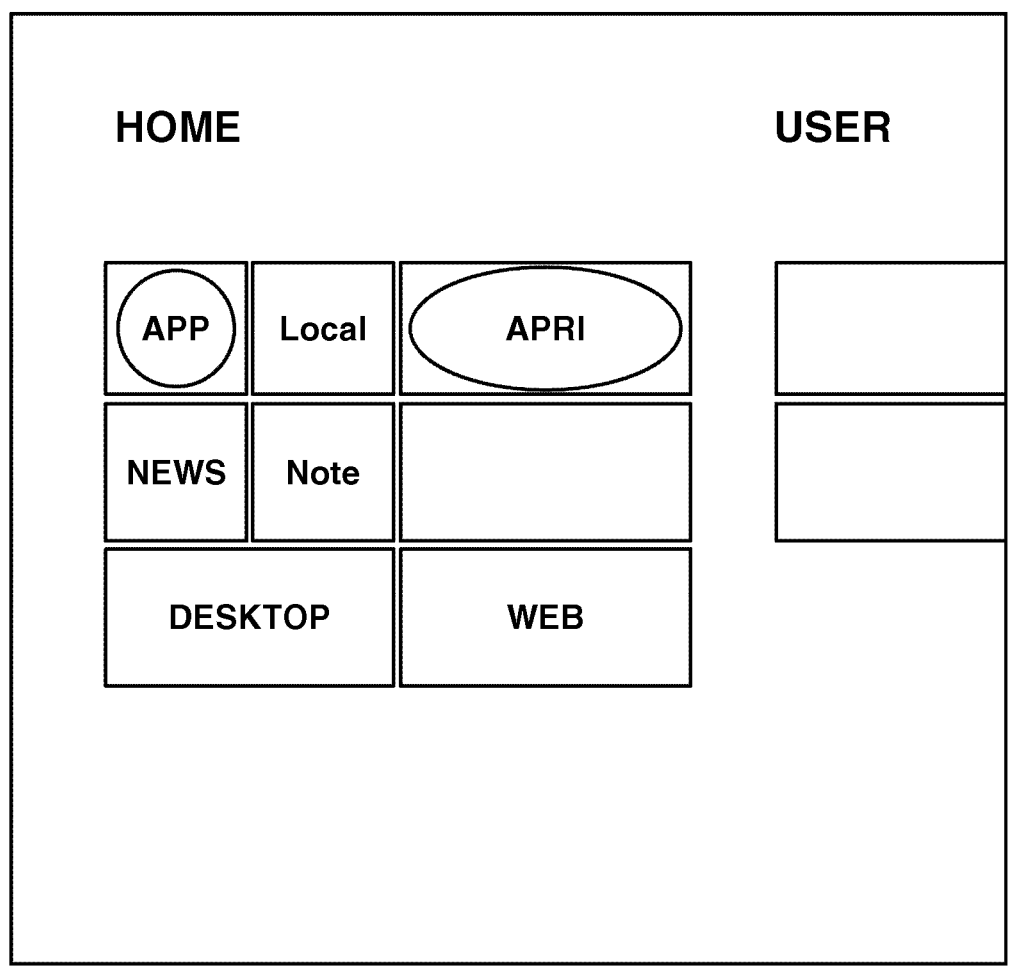
FIG. 7 illustrates an example of a UI environment optimized for a touch panel.

Recently, with the development of a mobile device such as a portable telephone or a tablet device, devices with small screens having only touch panels have increased in number. Thus, the OS includes, separately from a conventional UI environment (FIG. 6), a UI environment (FIG. 7) optimized for the touch panel. Hereinbelow, the conventional UI environment may be referred to as a desktop UI or a desktop UI environment. On the other hand, hereinbelow, the UI environment optimized for the touch panel may be referred to as a touch panel UI or a touch panel UI environment.

The UI environment optimum for the touch panel includes a button arrangement to facilitate an operation. A UI providing method is different between the desktop UI environment and the touch panel UI environment. For example, if a plurality of applications is active, in the touch panel UI environment, the number of applications to be displayed is limited to one, and only a UI of this application is displayed on the monitor 1041. Accordingly, UIs of the other active applications are not displayed. When the application of the display target is changed, a UI of the changed application is displayed on the monitor 1041. On the other hand, in the desktop UI environment, the UI of the active application and the UIs of the other applications can be simultaneously displayed on the monitor 1041. In addition, in the desktop UI environment, a configuration of data can be displayed in a tree structure. However, in the touch panel UI environment, a structure of data cannot be displayed in the tree structure.

Especially, an OS configured to switch the desktop UI and the touch panel UI has been developed. To create an application operated on such an OS, different packages for respective UIs need to be prepared.

The printer driver has compatibility. A printer driver installed in the desktop UI is usable from the touch panel UI application. Thus, the user can issue a print instruction from the touch panel UI application by the printer driver created for the desktop UI (also referred to as a desktop printer driver). For example, in FIG. 8, the user selects the desktop UI printer driver from the touch panel UI application, and selects a "Print" button to instruct printing. As a result, the desktop UI printer driver generates print data with use of rendering data issued from the touch panel UI application.

However, the printer driver includes the UI as described above, and when displaying of the UI is instructed from the touch panel UI application to the desktop UI printer driver, usability deteriorates. It is because for the user who performs an operation on the touch panel, the UI of the printer driver for the desktop UI based on an input from the mouse or the keyboard is too minute. Thus, in the touch panel UI environment, the UI of the printer driver for the desktop UI is not directly displayed, and the OS generates a UI (a screen 801 illustrated in FIG. 8) based on metadata of an XML form to receive print setting information, thereby improving usability.

However, in the UI generated based on the metadata of the XML form, receivable print setting information is limited to specific information. Consequently, for example, in the UI generated by the OS, confidential printing cannot be set.

It is assumed that, for example, the desktop UI printer driver in which confidential printing having an input dialogue displayed at the time of printing is set as an initial value is selected from the touch panel UI application. The input dialogue may also be referred to as an input user interface or an input UI.

Figure 8:
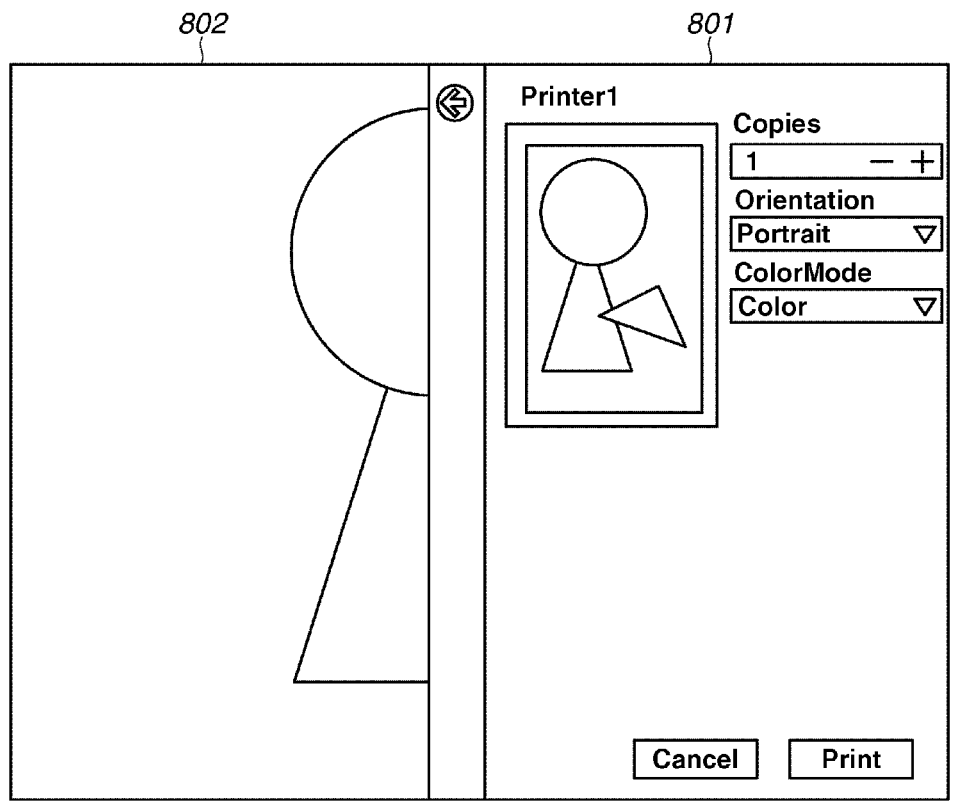
FIG. 8 illustrates an example of a UI to be used in printing which is displayed from a touch panel UI application.

The screen 801 illustrated in FIG. 8 is displayed by selecting the desktop UI printer driver in which print setting information having the input dialogue displayed at the time of printing is set as the initial value. When the user selects the "Print" button on the screen 801, the desktop UI printer driver executes display processing of an input dialogue to the desktop UI environment. In other words, even while a screen 802 of the touch panel UI application is displayed on the display screen (even while a current environment is the touch panel UI environment), the display processing of the input dialogue to the desktop UI environment is performed. Thus, it is difficult for the user operating the information processing apparatus to notice that the input dialogue is displayed. As a result, there is a possibility that the print processing may not appropriately progress due to no input of a password or the like to the input dialogue.

The present exemplary embodiment capable of solving the above-described issue will be described referring to a flowchart in FIG. 9.

Figure 9:
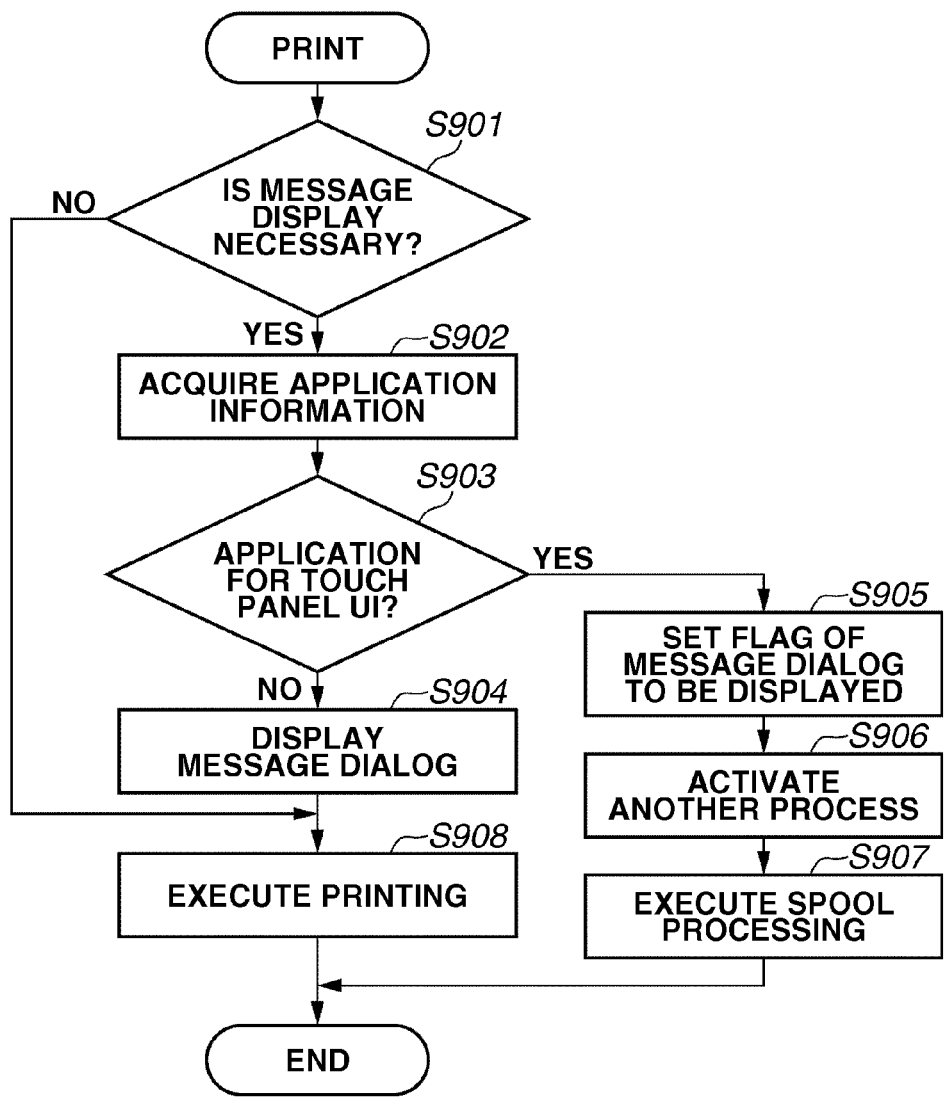
FIG. 9 is a flowchart illustrating an example of print processing according to the exemplary embodiment of the present invention.

The flowchart in FIG. 9 concerns processing of the desktop printer driver for prompting a user to input data by displaying the input dialogue at the time of printing. The printer driver 1052 will be described as the desktop printer driver, hereinbelow.

The processing in the flowchart is started when the printer driver 1052 receives a printing instruction from the application 1051. More specifically, the processing is started when the "Print" button is pressed on the screen 801 illustrated in FIG. 8.

In step S901, the printer driver 1052 determines whether the print setting information 3012 includes setting for prompting a user to input data by displaying the input dialogue. As the case of prompting a user to input data by displaying the input dialogue, there is a "confidential printing" function of causing the user to input a user name and a password and executing authentication on the printer side. Additionally, there are a "division management" function and a "FAX" function.

Figure 5B:
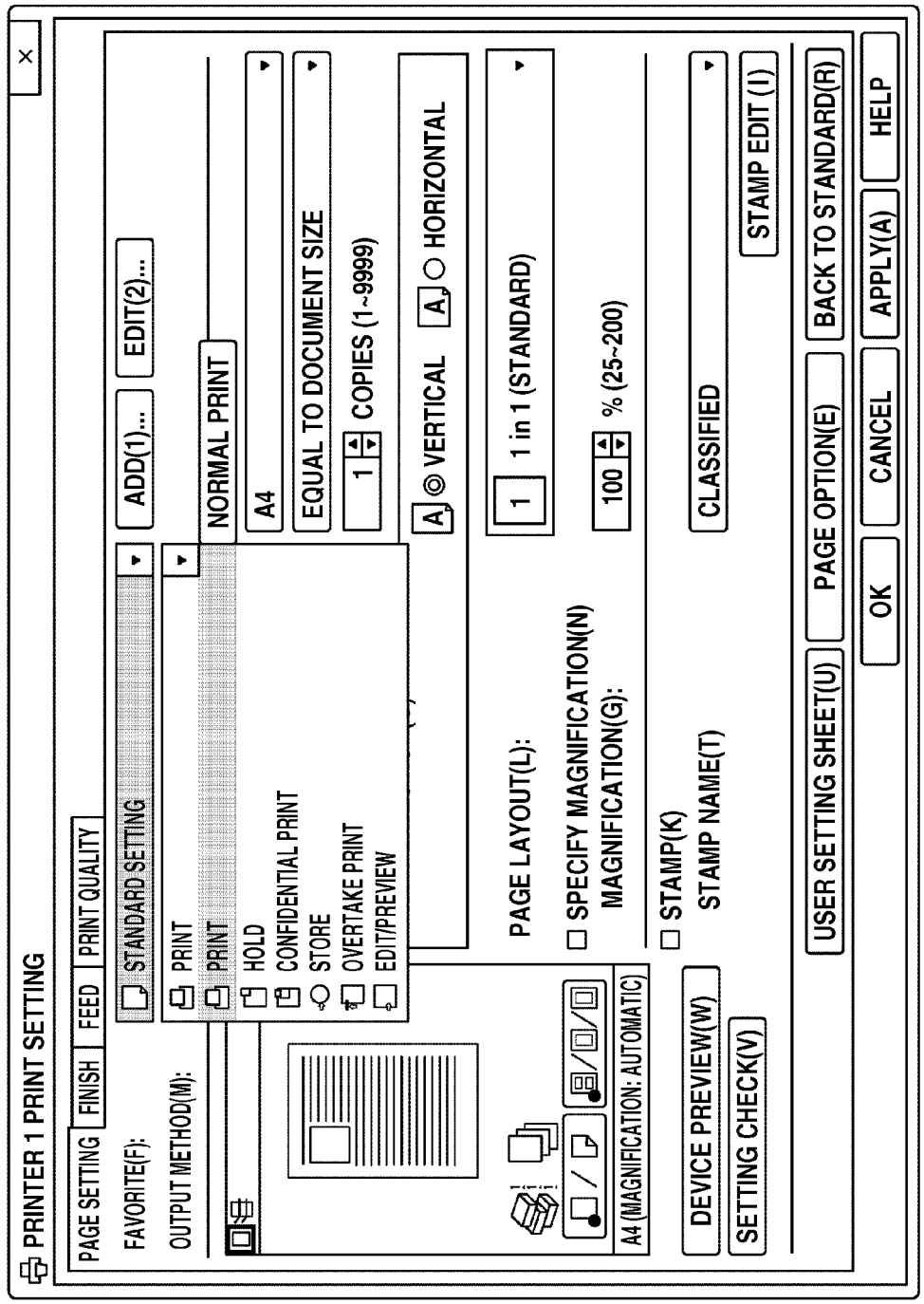
FIG. 5B illustrates a setting at the time of printing in the example of the user interface of the printer driver according to the exemplary embodiment of the present invention.
Figure 11A:
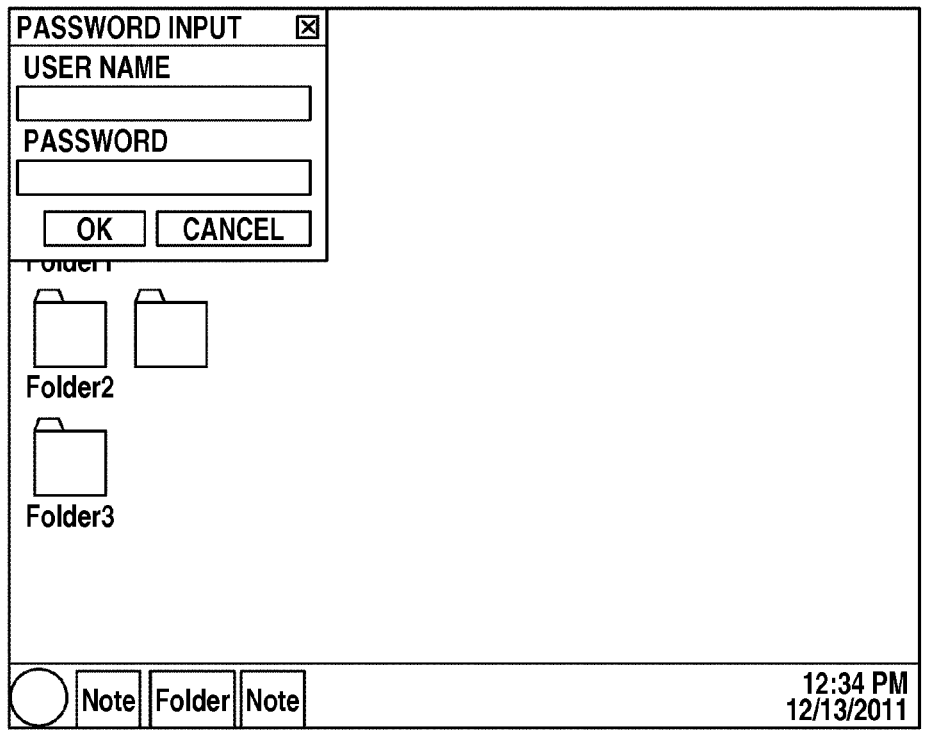
FIG. 11A illustrates an example of a message dialogue in the conventional UI environment according to the exemplary embodiment of the present invention.
Figure 11B:
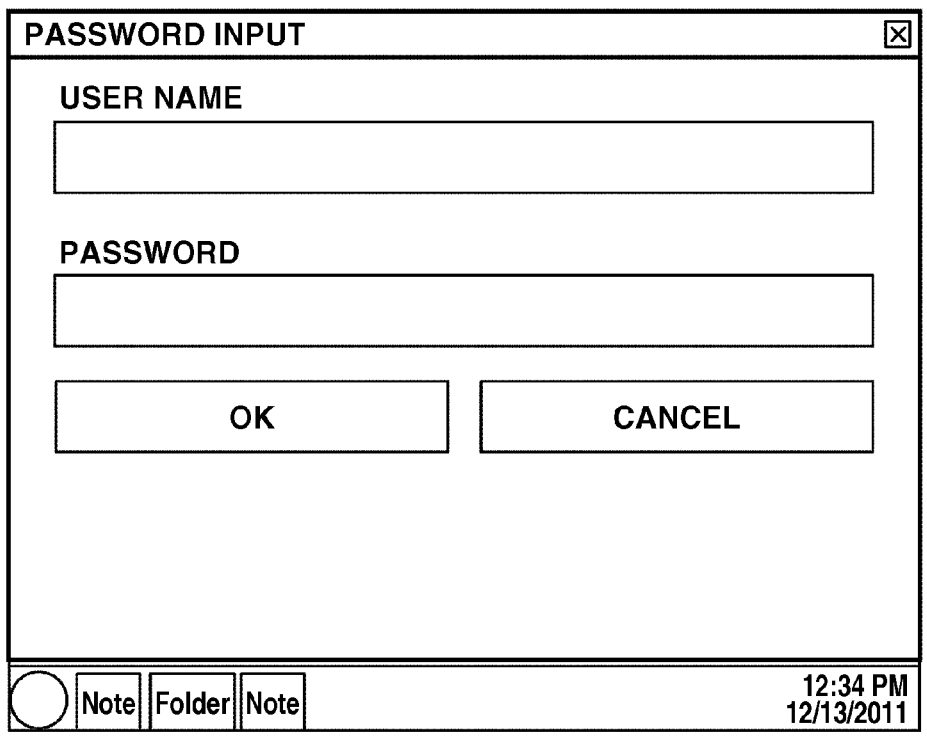
FIG. 11B illustrates an example of a message dialogue displayed at the time of printing from the touch panel UI application according to the exemplary embodiment of the present invention.

When the confidential printing is selected, as illustrated in FIGS. 11A and 11B, an input dialogue for inputting a user name and a password is displayed at the time of printing (when the "Print" button on the screen 801 illustrated in FIG. 8 is pressed). When the division management is selected, an input dialogue for inputting division identification (ID) and a password is displayed at the time of printing. When the FAX is selected, an input dialogue for inputting a telephone number is displayed at the time of printing. These functions are set by the driver UI illustrated in FIG. 5B, and there is a case where these functions are set beforehand as defaults.

When the printer driver 1052 determines that the print setting information 3012 does not include setting for prompting a user to input data by displaying the input dialogue at the time of printing (NO in step S901), rendering data 3011 and the print setting information 3012 are converted into print data. Then, the processing proceeds to step S908, and the printer driver 1052 transmits the print data to the printer. When the printer driver 1052 determines that the print setting information 3012 includes setting for prompting a user to input data by displaying the input dialogue (YES in step S901), the processing proceeds to step S902.

In step S902, when a printing instruction from the application is received, the printer driver 1052 acquires information of the application that has issued the printing instruction using the API.

Then, in step S903, the printer driver 1052 acquires a process name from the information of the application to determine whether the application is operated on the touch panel UI. More specifically, the printer driver 1052 compares an application name that has requested printing with an exe file name of the application, and determines that a printing request has been received from the desktop UI application when they match each other. On the other hand, when they do not match each other, the printer driver 1052 determines that a printing request has been received from the touch panel UI application.

The processing in step S903 may be performed by determining whether the application that has requested the printing is operated on a specific platform of the OS. More specifically, when it is determined that the application is operated on the specific platform of the OS, the application is determined to be a touch panel UI application. On the other hand, when it is determined that the application is not operated on the specific platform of the OS (i.e. when it is determined that the application is operated on a platform of the OS different from the specific platform of the OS), the application is determined to be a desktop UI application. Therefore, the specific platform of the OS provides the touch panel UI environment and the platform of the OS different from the specific platform provides the desktop UI environment.

Alternatively, the determination can be made with use of a Windows API. If the printer driver 1052 determines that the application is operated on the touch panel UI (YES in step S903), the processing proceeds to step S905. Whereas if it is determined that the application is operated on the desktop UI (NO in step S903), the processing proceeds to step S904.

When it is determined that the application is operated on the desktop UI, in step S904, the printer driver 1052 displays the input dialogue for prompting a user to input data on the desktop UI. More specifically, a screen as illustrated in FIG. 11A is displayed. Then, in step S908, the printer driver 1052 creates print data including information such as the user name and the password input via the screen as illustrated in FIG. 11A, and transmits the print data to the printer.

On the other hand, when it is determined that the application is operated on the touch panel UI (YES in step S903), in step S905, the printer driver 1052 sets a flag concerning the input dialogue for prompting a user to input data. The flag is for discriminating settings, for example, "confidential printing" or "division management". The flag is included in the extended print setting region 402 of the DEVMODE structure including the print setting information.

Then, in step S906, the printer driver 1052 activates the desktop UI print application operated on the desktop UI having a function of displaying the input dialogue via the print manager 306. At this time, the desktop UI print application is activated as a process different from that of the printer driver (an operation of the desktop UI print application will be described below referring to FIG. 10).

Then, in step S907, the printer driver 1052 generates a spool file 307 based on the rendering data and the print setting information issued from the application, and performs spool processing (stores) of the spool file 307. Then, the printer driver 1052 ends the print processing. In a state in which a user performs an operation in the touch panel UI environment, the software operated on the desktop UI is activated in another process, and the OS accordingly changes the touch panel UI environment to the desktop UI environment. According to the present exemplary embodiment, the software operated on the desktop UI may be referred to as a desktop UI print application.

Referring to a flowchart in FIG. 10, processing of the desktop UI print application activated by the printer driver in step S906 will described. According to the present exemplary embodiment, the desktop UI print application is based on the layout module illustrated in FIG. 3. However, the desktop UI print application is not limited to the layout module.

First, in step S1001, the desktop UI print application, which has been activated by the printer driver 1052, acquires the spool file generated in step S907.

Then, in step S1002, the desktop UI print application determines the flag stet in step S905 from the DEVMODE structure including the print setting information.

In step S1003, the desktop UI print application displays an input dialogue for prompting a user to input data on the desktop UI according to the flag. The input dialogue is displayed as a foreground UI with use of the API of Windows.

At this time, on the display, a focus is changed from the application (FIG. 8) operated on the touch panel UI (FIG. 7) to the input dialogue displayed on the desktop UI by the desktop UI application (FIG. 11A).

The desktop UI print application acquires, when the OK button illustrated in FIG. 11A or FIG. 11B is pressed, user input information such as a password input from the user.

Then, in step S1004, the desktop UI print application includes the acquired user input information in the print setting information to perform spool processing again.

Then, in step S1005, the desktop UI print application generates a spool file, and notifies the printer driver 1052 of the spool file. The printer driver 1052 generates print data based on the spool file notified from the desktop UI print application in step S1005, and transmits the print data to the printer. Through this processing, the print data based on the print setting information including the rendering data and the user input information is generated.

According to the present exemplary embodiment, when the "Print" button is pressed in the state illustrated in FIG. 8, the printer driver performs the processing in the flowchart illustrated in FIG. 9. Then, based on the processing result of the flowchart in FIG. 9, the printer driver activates the application operated on the desktop UI in the process different from that of the printer driver. As a result, by changing to the screen illustrated in FIG. 11A, the state is set to facilitate acquisition of the user input information.

However, as long as the desktop UI software including a display UI is activated in a process different from that of the printer driver, the processing is not limited to the application operated on the desktop UI. For example, a desktop UI program or module for displaying a UI in the foreground of the desktop UI may be used.

According to the present exemplary embodiment, in printing from the application operated on the touch panel UI, when displaying of the input dialogue for prompting a user to input data is necessary, the printer driver 1052 activates the application operated on the desktop UI in a different process. Accordingly, the OS changes the screen from the touch panel UI environment to the desktop UI environment, and the input dialogue is displayed in the foreground of the changed desktop UI. Thus, a user can easily notice displaying of the input dialogue illustrated in FIG. 11A.

Referring to FIGS. 11A and 11B, the input dialogue for prompting a user to input data will be described.

The example of displaying the screen in FIG. 11A in step S1003 has described above. However, when the screen in FIG. 11A is displayed by the operation of the touch panel UI and the processing illustrated in FIGS. 9 and 10, a touching operation may be difficult.

Accordingly, in step S1003, the application operated on the desktop UI displays a screen in FIG. 11B.

An input dialogue illustrated in FIG. 11B is larger in size than the input dialogue illustrated in FIG. 11A, and is displayed on the entire screen. The dialogue in FIG. 11B is obtained such that resource information pieces such as a character string, an input column, a button, and the like of the message dialogue illustrated in FIG. 11A are acquired, and a different application operated on the desktop UI as described the processing in FIG. 10 enlarges and rearranges to display the respective resources. The different application may store these resources.

For example, in a case where the processing of the present exemplary embodiment is performed and the environment is changed from the touch panel UI environment to the desktop UI environment when the user executes the process from the touching operation on the touch panel UI, the input dialogue is displayed on the entire screen as illustrated in FIG. 11B. Accordingly, a UI can be provided to facilitate a user's touching operation on the desktop UI as well.

In addition, when the input dialogue for prompting a user to input data is displayed, the size of the input dialogue is not greatly changed. Thus, the user is not overly disturbed.

Figure 12:
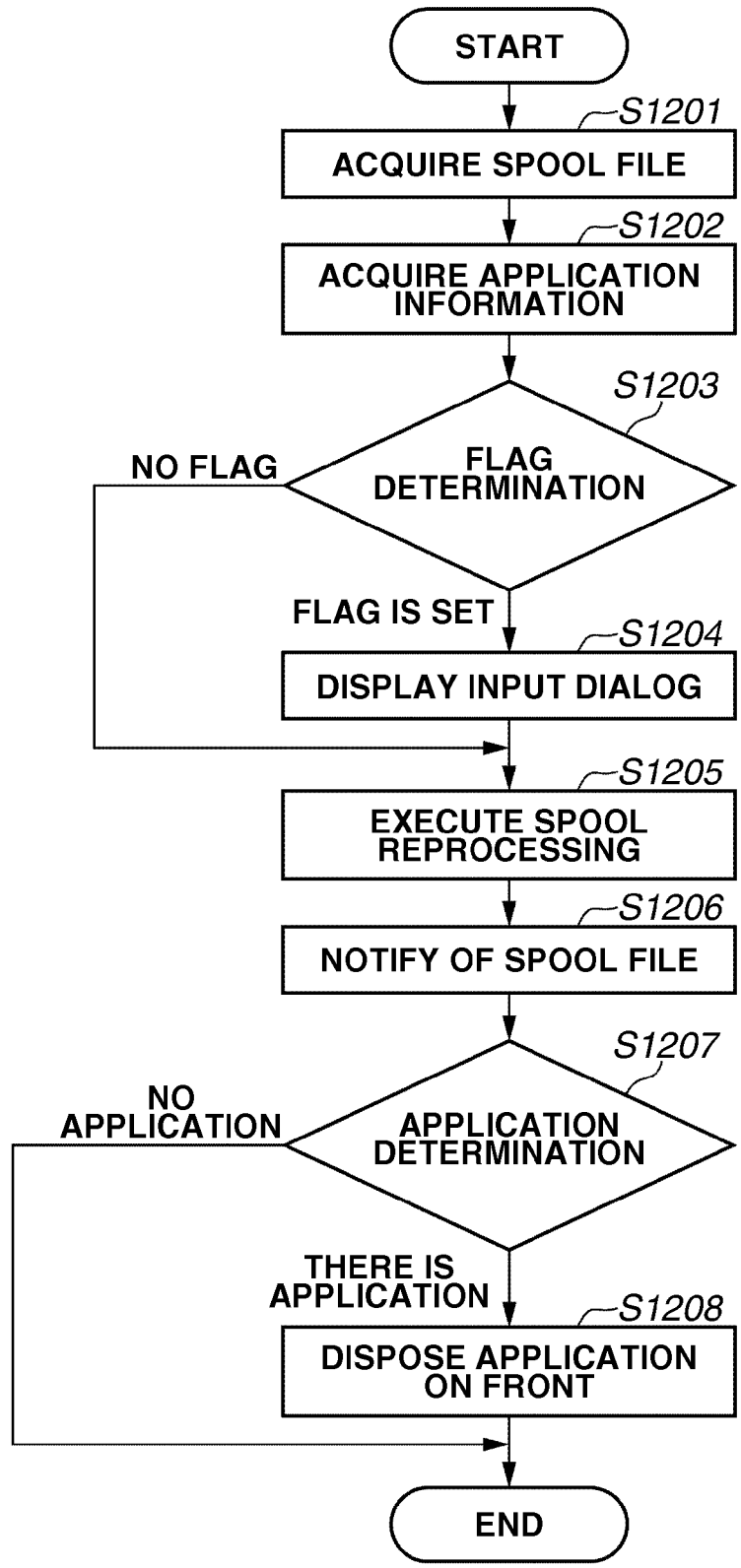
FIG. 12 is a flowchart illustrating an example of processing of a process activated by the printer driver according to the exemplary embodiment of the present invention.

In a case where the environment is changed to the desktop UI environment by the processing illustrated in FIG. 9 when the user executes the touching operation on the touch panel UI, and the processing is ended in the state illustrated in FIG. 11A or 11B, the user needs to return the environment to the touch panel UI environment. Referring to a flowchart in FIG. 12, processing for reducing a user's operation in such a case will be described.

In step S1201, the processing in the flowchart is started when the desktop UI application activated in another process acquires a spool file as in the case in step S1001.

Then, in step S1202, the desktop UI application acquires application information from print setting information of the spool file. The application information acquired in step S1202 is information acquired by the printer driver in step S902. The processing in steps S1203 to S1206 are similar to those in steps S1002 to S1005 illustrated in FIG. 10, and thus description thereof will be omitted.

After the processing in step S1206, the desktop UI print application acquires a list of applications and processes activated by using the API of Windows. Then, in step S1207, the desktop UI print application determines whether there is any process matching the acquired application based on the application information acquired in step S1202.

If there is no process matching the application (NO APPLICATION in step S1207), the processing is ended. On the other hand, if there is a process matching the application, in step S1208, the desktop UI print application displays the UI of the application in the foreground, and the processing in the flowchart is ended.

Thus, even if the environment is changed from the touch panel UI to the desktop UI by performing the processing illustrated in FIG. 9 when the user executes the process from the touching operation on the touch panel UI, the user can return to the touch panel application that was in use.

According to the present exemplary embodiment, the user can easily notice display of the input dialogue for receiving the user input information.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-006044 filed Jan. 16, 2012, which is hereby incorporated by reference herein in its entirety.

What is claimed is:

1. An information processing apparatus comprising:
a determination unit configured to determine, if, in a first environment, a printing instruction is received from a printer driver operated in the first environment and print setting information for the printing instruction includes print setting information requiring input of user information, whether the printer driver that has transmitted the printing instruction is capable of displaying, in the first environment, an input user interface for inputting the user information;
a first display control unit configured to display, in the first environment, the input user interface for inputting the user information if the determination unit determines that the printer driver is capable of displaying, in the first environment, the input user interface for inputting the user information;
an activation unit configured to activate software operated in a second environment different from the first environment if the determination unit determines that the printer driver is not capable of displaying, in the first environment, the input user interface for inputting the user information; and
a second display control unit configured to display, in the second environment, an input user interface for inputting the user information,
wherein in response to the activation of the software by the activation unit, a user interface is changed from the first environment to the second environment, and an input user interface for inputting the user information is displayed in the second environment, and
wherein the activation unit does not activate the software if the print setting information does not include print setting information requiring input of user information.

2. The information processing apparatus according to claim 1, further comprising a generation unit configured to generate, in a case where user information is input to the input user interface displayed in the second environment in response to activation of the software by the activation unit and a printing instruction is received, print data based on the print setting information, rendering data issued by an application operated in the first environment, and the user information.

3. The information processing apparatus according to claim 1,
wherein the determination unit is further configured to determine whether an application for instructing printing is a printer driver operated in the first environment or an application operated in the second environment; and further comprising:
a display unit configured to display an input user interface for inputting the user information, in a case where the determination unit determines that the application is an application operated in the second environment,
wherein the activation unit activates the software, in a case where the determination unit determines that the application is the printer driver operated in the first environment.

4. The information processing apparatus according to claim 3, wherein a size of the input user interface displayed in the second environment in response to the activation of the software by the activation unit is larger than a size of the input user interface displayed by the display unit.

5. The information processing apparatus according to claim 1, further comprising an instruction unit configured to issue, after user information is input to the input user interface displayed in the second environment in response to activation of the software by the activation unit and a printing instruction is received, an instruction to display a user interface of an application operated in the first environment for instructing printing.

6. The information processing apparatus according to claim 1, wherein a specific platform of an operating system (OS) provides the first environment and a platform of the OS different from the specific platform provides the second environment.

7. The information processing apparatus according to claim 1, wherein the user information includes an identification and a password.

8. The information processing apparatus according to claim 1, wherein the first environment is a desktop user interface environment, and the second environment is a touch panel user interface environment.

9. A method for performing control, the method comprising:
   determining, if, in a first environment, a printing instruction is received from a printer driver operated in the first environment and print setting information for the printing instruction includes print setting information requiring input of user information, whether the printer driver that has transmitted the printing instruction is capable of displaying, in the first environment, an input user interface for inputting the user information;
   displaying, in the first environment, the input user interface for inputting the user information if the determination unit determines that the printer driver is capable of displaying, in the first environment, the input user interface for inputting the user information;
   activating software operated in a second environment different from the first environment if the determination unit determines that the printer driver is not capable of displaying, in the first environment, the input user interface for inputting the user information;
   displaying, in the second environment, an input user interface for inputting the user information;
   changing a user interface from the first environment to the second environment in response to the activation of the software and displaying an input user interface for inputting the user information in the second environment; and
   not activating the software if the print setting information does not include print setting information requiring input of user information.

10. The method according to claim 9, further comprising generating, in a case where user information is input to the input user interface displayed in the second environment in response to activation of the software and a printing instruction is received, print data based on the print setting information, rendering data issued by an application operated in the first environment, and the user information.

11. The method according to claim 9, further comprising:
   determining whether an application for instructing printing is a printer driver operated in the first environment or an application operated in the second environment;
   displaying an input user interface for inputting the user information, in a case where the application is determined to be an application operated in the second environment; and
   activating the software, in a case where the application is determined as a printer driver operated in the first environment.

12. The method according to claim 11, wherein a size of the input user interface displayed in the second environment in response to the activation of the software is larger than a size of the input user interface displayed in the first environment.

13. The method according to claim 9, further comprising issuing, after user information is input to the input user interface displayed in the second environment in response to activation of the software and a printing instruction is received, an instruction to display a user interface of an application operated in the first environment for instructing printing.

14. The method according to claim 9, wherein a specific platform of an operating system (OS) provides the first environment and a platform of the OS different from the specific platform provides the second environment.

15. The method according to claim 9, wherein the user information includes an identification and a password.

16. The method according to claim 9, wherein the first environment is a desktop user interface environment, and the second environment is a touch panel user interface environment.

17. A non-transitory storage medium storing a program for causing a computer to function as an activation unit, the program comprising:
   determining, if, in a first environment, a printing instruction is received from a printer driver operated in the first environment and print setting information for the printing instruction includes print setting information requiring input of user information, whether the printer driver that has transmitted the printing instruction is capable of displaying, in the first environment, an input user interface for inputting the user information;
   displaying, in the first environment, the input user interface for inputting the user information if the determination unit determines that the printer driver is capable of displaying, in the first environment, the input user interface for inputting the user information;
   activating software operated in a second environment different from the first environment if the determination unit determines that the printer driver is not capable of displaying, in the first environment, the input user interface for inputting the user information;
   displaying, in the second environment, an input user interface for inputting the user information;
   changing a user interface from the first environment to the second environment in response to the activation of the software by the activation unit and displaying an input user interface for inputting the user information in the second environment; and
   not activating the software if the print setting information does not include print setting information requiring input of user information.

18. The storage medium according to claim 17, wherein the program further causes the computer to function as a generation unit configured to generate, in a case where user information is input to the input user interface displayed in the second environment in response to activation of the software by the activation unit and a printing instruction is received, print data based on the print setting information, rendering data issued by a printer driver operated in the first environment, and the user information.

19. The storage medium according to claim 17, wherein the program further causes the computer to function as:
   a determination unit configured to determine whether an application for instructing printing is a printer driver operated in the first environment or an application operated in the second environment; and
   a display unit configured to display an input user interface for inputting the user information, in a case where the determination unit determines that the application is the one operated in the second environment,
   wherein the activation unit activates the software, in a case where the determination unit determines that the application is the printer driver operated in the first environment.

20. The storage medium according to claim 17, wherein a size of the input user interface displayed in the second environment in response to the activation of the software by the activation unit is larger than a size of the input user interface displayed by the display unit.

21. The storage medium according to claim 17, wherein a specific platform of an operating system (OS) provides the first environment and a platform of the OS different from the specific platform provides the second environment.

22. The storage medium according to claim 17, wherein the first environment is an environment in which a user interface of an active application is displayed while user interfaces of other applications are not displayed, and the second environment is an environment in which a user interface of an active application and user interfaces of the other applications are displayed.

23. The non-transitory storage medium according to claim 17, wherein the first environment is a desktop user interface environment, and the second environment is a touch panel user interface environment.

* * * * *